(12) United States Patent
Vulkan et al.

(10) Patent No.: US 10,465,634 B2
(45) Date of Patent: Nov. 5, 2019

(54) VEHICLE FUEL ACCESSORY

(71) Applicant: Raval A.C.S. Ltd., Beer-Sheva (IL)

(72) Inventors: Omer Vulkan, D.N. Hanegev (IL); Vladimir Olshanetsky, Beer Sheva (IL); Denis Kleyman, Beer Sheva (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 0 days.

(21) Appl. No.: 14/422,652

(22) PCT Filed: Aug. 20, 2013

(86) PCT No.: PCT/IL2013/050705
§ 371 (c)(1),
(2) Date: Feb. 19, 2015

(87) PCT Pub. No.: WO2014/030160
PCT Pub. Date: Feb. 27, 2014

(65) Prior Publication Data
US 2016/0222923 A1 Aug. 4, 2016

Related U.S. Application Data

(60) Provisional application No. 61/684,837, filed on Aug. 20, 2012.

(51) Int. Cl.
*F02M 25/08* (2006.01)
*B60K 15/035* (2006.01)

(52) U.S. Cl.
CPC .......... *F02M 25/08* (2013.01); *B60K 15/035* (2013.01); *B60K 2015/03509* (2013.01)

(58) Field of Classification Search
CPC ........ F02M 25/08; F02M 37/00; F02M 37/20; B60K 15/035; B60K 2015/03509;
(Continued)

(56) References Cited

U.S. PATENT DOCUMENTS 2,009,352 A * 7/1935 Adams ................. B01D 50/002
55/315.2
2,850,259 A * 9/1958 Larson .................... F16K 1/482
251/158

(Continued)

FOREIGN PATENT DOCUMENTS

| CN | 101476485 A | 7/2009 |
|---|---|---|
| CN | 201390149 Y | 1/2010 |

(Continued)

OTHER PUBLICATIONS

NPL #1—English translation of JP 49-046018 A (Aisan Industry Co., LTD; May 2, 1974), as obtained from J-PlatPat (Reference provided by Applicants on the IDS filed on Aug. 16, 2017).*

(Continued)

*Primary Examiner* — Michael R Reid
(74) *Attorney, Agent, or Firm* — Vorys, Sater, Seymour & Pease LLP; William L. Klima

(57) ABSTRACT

Provided is a fuel accessory for a vehicle's fuel system, the fuel accessory including a housing configured with a confined space, at least one fluid inlet port extending into the confined space, at least one fluid outlet port extending from the confined space, and at least one liquid drain port extending from the confined space. An inlet flow path defined by the inlet port extends tangentially relative to a wall portion in the confined space.

22 Claims, 10 Drawing Sheets

(58) Field of Classification Search
CPC ....... F16T 1/00; F16T 1/34; F16T 1/22; F16T 1/10; F16T 1/14; F16T 1/16; F16T 1/165; F16T 1/38; F16T 1/48; F16L 55/07; B60T 17/004; F16K 24/04; F16K 24/06; F24D 19/081; B01D 19/00; B01D 19/0057; B01D 19/0052; B01D 19/0042
USPC ................. 137/177–196, 203, 808; 251/299; 141/304; 222/402.1, 402.14, 402.15
See application file for complete search history.

(56) References Cited

U.S. PATENT DOCUMENTS

| | | | |
|---|---|---|---|
| 3,800,978 | A | 4/1974 | Sigwald |
| 3,934,990 | A * | 1/1976 | Ide, III ................ B01D 45/12 137/204 |
| 4,814,087 | A | 3/1989 | Taylor |
| 5,215,132 | A * | 6/1993 | Kobayashi ....... B60K 15/03519 123/518 |
| 6,318,398 | B1 | 11/2001 | Ehrman et al. |
| 6,405,747 | B1 | 6/2002 | King et al. |
| 6,453,925 | B1 * | 9/2002 | Kamo ..................... G03D 3/06 137/173 |
| 7,694,665 | B2 | 4/2010 | Ehrman et al. |
| 2002/0121300 | A1 * | 9/2002 | Ehrman ........... B60K 15/03519 137/202 |
| 2006/0032549 | A1 * | 2/2006 | McClung ............... B60K 15/04 141/97 |
| 2008/0184972 | A1 * | 8/2008 | Ehrman ........... B60K 15/03504 123/518 |

FOREIGN PATENT DOCUMENTS

| | | |
|---|---|---|
| CN | 102080587 A | 6/2011 |
| CN | 201872599 U | 6/2011 |
| FR | 2.164.969 A5 | 8/1973 |
| JP | 49-46018 A | 5/1974 |
| JP | 55-119954 A | 9/1980 |
| JP | 58-63005 U | 4/1983 |
| JP | 62-53226 A | 3/1987 |
| JP | 2002-256985 A | 9/2002 |
| JP | 2009-133235 A | 6/2009 |
| JP | 2010-534793 A | 11/2010 |
| KR | 10-2010-0045492 A | 5/2010 |
| RU | 2 439 410 C2 | 1/2012 |
| WO | 98/50717 A1 | 11/1998 |
| WO | WO-2007088023 A1 * | 8/2007 ....... B60K 15/03504 |
| WO | 2009/018002 A1 | 2/2009 |

OTHER PUBLICATIONS

Korean Office Action issued for corresponding KR Application No. 10-2015-7006792, dated Mar. 18, 2019, with English Translation, 17 pages.

* cited by examiner

VEHICLE FUEL ACCESSORY

TECHNOLOGICAL FIELD

The present disclosed subject matter is concerned with vehicle fuel accessories. More particularly the disclosed subject matter is directed to a liquid vapor separator and to a liquid trap, both configured for use in conjunction with a vehicle's fuel system.

BACKGROUND OF THE PRESENTLY DISCLOSED SUBJECT MATTER

It is known in the field of vehicles and fuel systems, to use a filter canister (fuel vapor filter typically a fuel vapor filter) for fuel vapor exiting the fuel tank. The fuel vapor carried from the fuel system often contains an amount of fuel droplets which may have a damaging effect on the operation of the fuel vapor filter.

A wide variety of solutions has been offered to prevent the introduction of fuel droplets into the fuel vapor filter along with the fuel vapor.

One such solution is using a liquid vapor separator, for example as disclosed in U.S. Pat. No. 6,405,747 directed to an apparatus for controlling discharge of fuel vapor from within a vehicle fuel tank, which apparatus includes at least a primary and auxiliary liquid separating chamber positioned above a float chamber below a valve outlet. The apparatus includes at least one baffle arranged to intercept and direct filtered fuel droplets from the vapor flow and return the liquid fuel to the fuel tank. The primary and auxiliary liquid separation chambers and associated baffle are positioned to facilitate flow of fuel vapor from the tank yet return liquid fuel to the tank.

Another solution for dealing with the above problem, is in the form of expansion tanks, for example as discussed in U.S. Pat. No. 6,318,398 to the applicant of the present application, which discloses a fuel expansion device for a vehicle fuel tank, the device comprising a housing formed of a first housing member and a second housing member, both made of an essentially impermeable material and being sealingly and impermeably attached to one another. At least one inlet port for fuel fluid ingress is formed in the first member and is in flow communication with the fuel tank, and an outlet port is formed in the second member connectable to a fuel fluid handling device.

U.S. Pat. No. 7,694,665 discloses a liquid vapor separator for a vehicle's fuel system, said liquid vapor separator comprising a body having an inlet connectable with a venting system of a fuel tank and a vapor outlet connectable to a fuel vapor treating device, and a condensation space for condensation of fuel droplets, said space being in flow communication with said inlet and with said outlet, and said condensation space extending at or being in flow communication with a filler neck of the fuel system.

GENERAL DESCRIPTION

The present disclosure provides a fuel accessory for a vehicle's fuel system, such an accessory comprising a housing configured with a confined space, at least one fluid inlet port extending into said confined space, at least one fluid outlet port extending from said confined space, and at least one liquid drain port extending from the confined space, wherein an inlet flow path defined by the inlet port extends tangentially relative to a wall portion in the confined space. The wall portion can constitute a portion of the inner surface of the side walls of the confined space and the housing of the fuel accessory. The inlet port can extends into the confined space and in a non-direct flow path towards an inlet opening of the fluid outlet port.

The arrangement is such that the tangentially extending inlet port results in improved separation of liquid droplets from fuel vapor ingressing through the fluid inlet port, that owing to centrifugal force generated by the tangential flow path, wherein the ingressing fuel vapor is directed and forced to flow about at least a portion of the side walls of the confined space, whereby liquid droplets separate from the vapor and flow towards the liquid drain port, and fuel vapor flows out through the at least one fluid outlet port.

Furthermore, a flow path between the inlet port and the inlet opening of the fluid outlet port is substantially non-linear, i.e. fluid vapor flowing into the confined space can not directly flow out through the inlet opening of the fluid outlet port, but is rather compelled to flow (in a spinning pattern) about at least a portion of inside surface of the housing. To achieve that purpose, one or more of the following design features are followed:

- the inlet port and the inlet opening of the fluid outlet port extend at different axial elevations within the housing; according to a particular example the inlet port extends axially below the outlet port;
- the inlet port and the inlet opening of the fluid outlet port are offset, i.e. not coaxial;
- the inlet port and the inlet opening of the fluid outlet port are radially offset, i.e. substantially not near one another.

According to a first aspect of the disclosed subject matter, the fuel accessory is a liquid trap comprising a housing configured for mounting within a fuel tank and comprising side walls, a bottom wall and a top, defining together a confined space; at least one fluid inlet port extending into said confined space; at least one fluid outlet port extending from said confined space; and at least one liquid drain port extending from the confined space, wherein the inlet port extends about a substantially tangential flow path into the confined space and in a non-direct flow path towards an inlet opening of the fluid outlet port.

According to a second aspect of the disclosed subject matter, the fuel accessory is a liquid vapor separator (LVS) comprising a housing with side walls, a bottom wall and a top, defining together a confined space; at least one fluid inlet port extending into said confined space; at least one fluid outlet port extending from said confined space; and at least one at least one liquid drain port extending from the confined space and configured for coupling to a filler pipe of a fuel tank, wherein the inlet port extends about a substantially tangential flow path into the confined space and in a non-direct flow path towards an inlet opening of the fluid outlet port.

Any one or more of the following features, designs and configurations can be applied to a fuel accessory according to the disclosure, separately or in combinations thereof:

- The inlet opening of the fluid outlet port is moved from walls of the confined space, i.e. does not extend flush with walls of the confined space;
- The fuel accessory is a liquid trap comprising a housing configured for mounting within a fuel tank, wherein the top of the housing is a wall portion of the housing;
- The fuel accessory is a liquid trap comprising a housing configured for mounting within a fuel tank, wherein the top of the housing is a top wall of the fuel tank;

The inlet opening of the at least one fluid outlet port is configured as an annular extension extending downwards from a bottom surface of the top of the housing;

The annular extension of the at least one inlet opening of the fluid outlet port extends substantially normal to a bottom surface of the top;

The at least one fluid inlet port extends into the confined space at a right angle with respect to a longitudinal axis of the at least one inlet opening of the fluid outlet port;

Side walls of the housing are at least partially curved, at least at a location of an inlet opening of the at least one fluid inlet port;

The side wall of the housing at the location of the of the at least one fluid inlet port smoothly merges with an inlet flow path of the at least one fluid inlet port, whereby flow pattern of the fluid flow path entering the housing is substantially uninterrupted;

Where the fuel accessory is a liquid trap, the confined space is substantially homogeneous, i.e. devoid of condensation elements such as walls and ribs, whereby condensation takes place over the side walls of the confined space;

Where the fuel accessory is liquid vapor separator the at least one liquid drain port is configured for fitting to a filler pipe (also referred to as 'filler neck') of a fuel tank;

The at least one liquid drain port is configured with a control valve facilitating controlled fluid flow therethrough;

The control valve can be a one way valve, facilitating fluid flow therethrough only in one direction so as to drain fluid from the confined space and to prevent fluid ingress therethrough. However, the control valve can be of any type, setting as an example only an inverted mushroom-type valve, a spring biased membrane, any type of valve-governed valve, e.g. a rollover valve, etc. also, the valve can be an active valve member, e.g. an active pump valve.

Where the fuel accessory is liquid vapor separator the at least one liquid drain port is associated with a shutoff gate configured for closing by a filling head introduced into the filler pipe;

Where the fuel accessory is liquid vapor separator the at least one liquid drain port can extend substantially below the at least one fluid outlet port;

The at least one fluid outlet port is configured for coupling to a fuel vapor treating device, such as a canister, an expansion tank, and the like;

The fuel accessory comprises one fuel outlet port with a longitudinal axis thereof extending parallel to a longitudinal axis of one liquid drain port, both extending substantially normal to a longitudinal axis of one fuel inlet port;

An outlet nipple (coupler) of the outlet port extends laterally from the side wall of the housing or projects upwards from the top of the housing and is than configured with elbow coupler nipple, i.e. extending sideward.

According to a further aspect of the presently disclosed subject matter there is provided a fuel tank configured with a fuel accessory. The fuel accessory includes a housing defining with a confined space, at least one fluid inlet port extending into the confined space, at least one fluid outlet port extending from the confined space, and at least one liquid drain port extending from the confined space, wherein an inlet flow path defined by the inlet port extends tangentially relative to a wall portion in the confined space.

According to yet another aspect of the presently disclosed subject matter there is provided a vehicle having a fuel tank configured with a fuel accessory. The fuel accessory includes a housing defining with a confined space, at least one fluid inlet port extending into the confined space, at least one fluid outlet port extending from the confined space, and at least one liquid drain port extending from the confined space, wherein an inlet flow path defined by the inlet port extends tangentially relative to a wall portion in the confined space.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1:
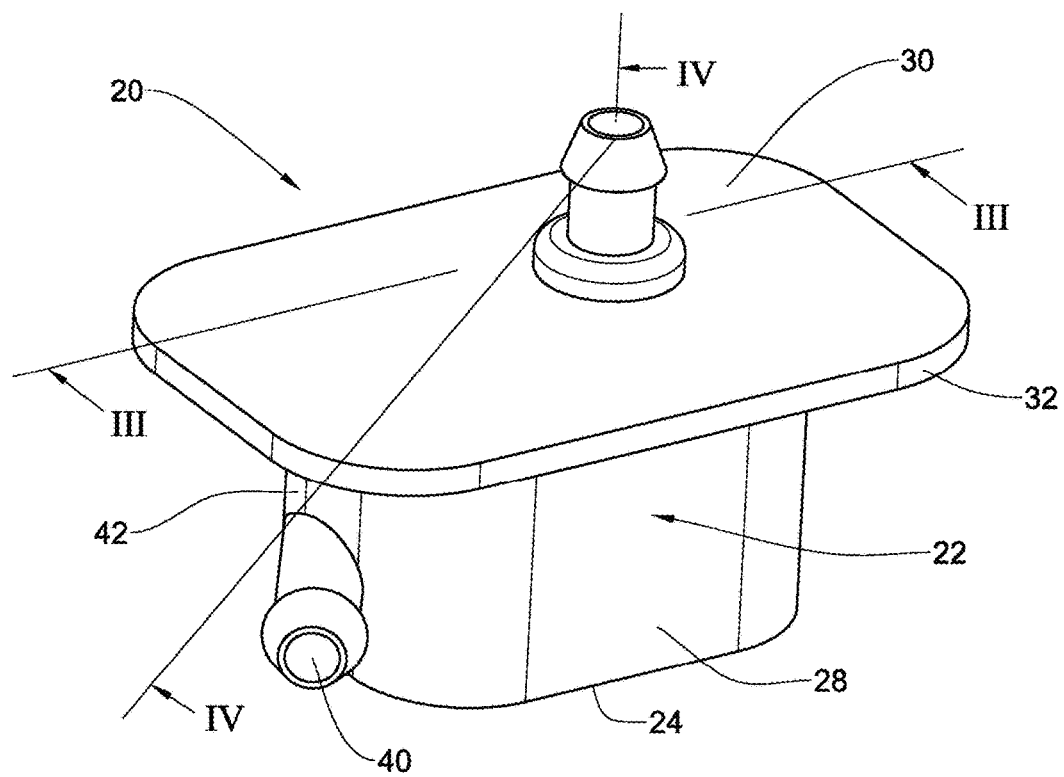
FIG. 1 is a top isometric view of a fuel accessory being a liquid trap, according to a first aspect of the disclosed subject matter.
Figure 2A:
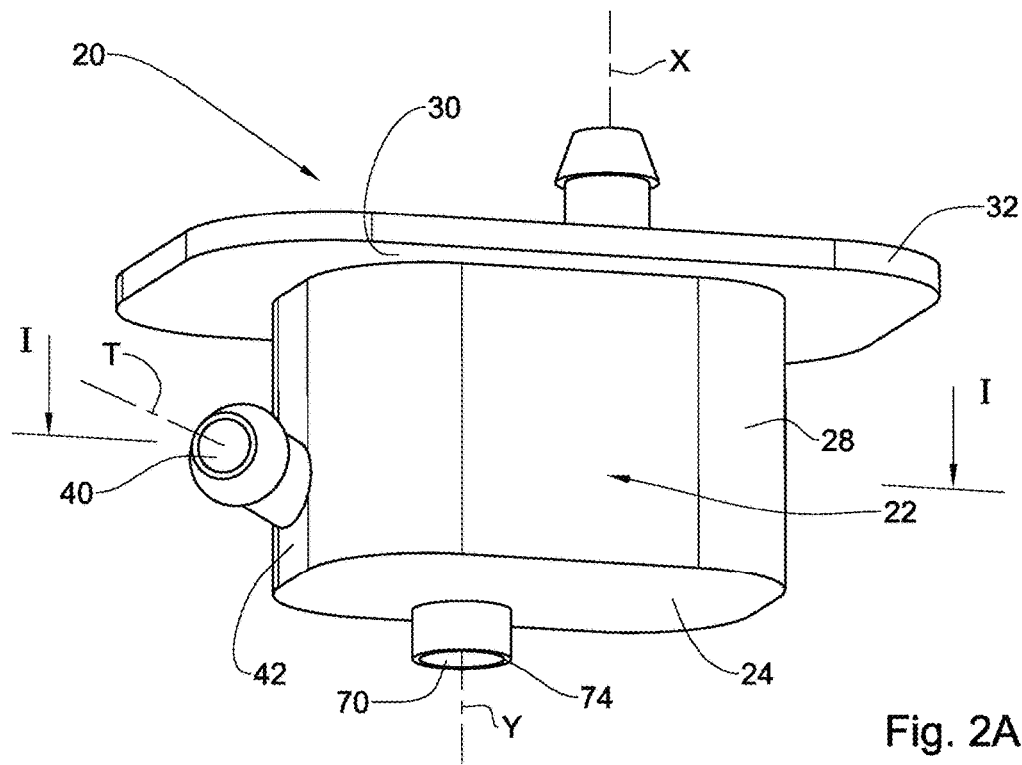
FIG. 2A bottom isometric view of the liquid trap of FIG. 1.
Figure 2B:
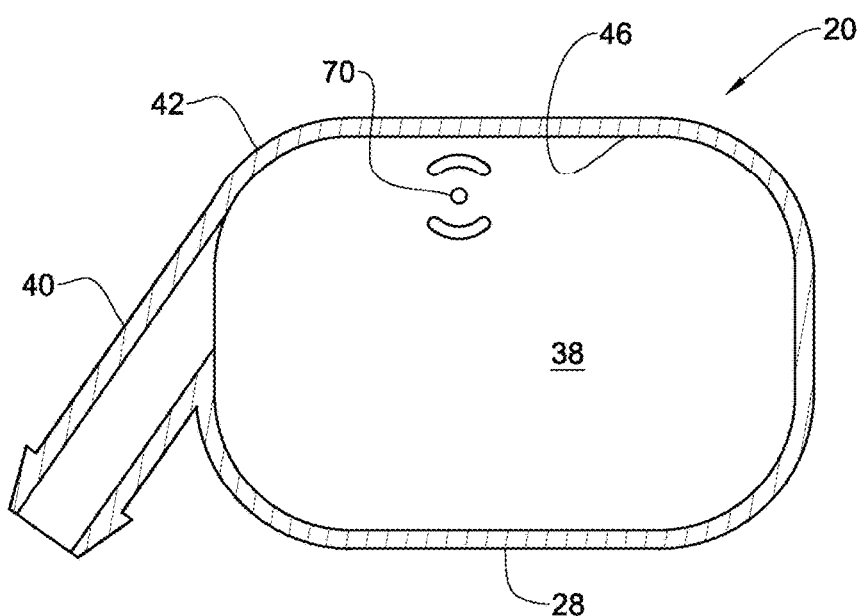
FIG. 2B section taken along line I-I in FIG. 2A.

Attention is first directed to FIGS. 1 to 3B of the drawings, directed to a first aspect of the present disclosed subject matter, being a fuel liquid trap and generally designated 20.

The liquid trap 20 comprises a housing generally designated 22 with a base 24, a continuous side wall 28 extending therefrom and a top 30, defining together a confined space designated 38.

Noting the fuel accessory is a liquid separator 20, it is thus configured for fitting within a vehicle's fuel tank (not shown), and it is further noted that in the present illustrated example the top 30 constitutes a top wall portion 36 of a fuel tank. However, it is appreciated that rather than constituting a top wall of a fuel tank, the top can just as well be an independent wall member extending from the side walls of the housing 22, and thus the housing is configured for articulation within the fuel tank as a unitary item, i.e. not integrated with a top wall of the fuel tank, but rather attached thereto.

The base 24, side wall 28 and top 30 define together a fluid-tight confined space 38 (FIGS. 3A and 3B) with a liquid inlet port 40 extending into the confined space 38 at a curved side wall portion 42. The liquid inlet port 40 extends substantially tangent to the side wall 28 and a flow path through the liquid inlet port merges with the wall portion 42 such that the flow path is minimally interrupted as it enters the confined space 38, and whereby fluid ingressing through the inlet port 40 is caused to swirl about the inside surface 46 of the side walls 28, as represented by arrowed line 50, thus imparting the ingressing fluid a cyclonical flow pattern along the inside 46 surface of the side walls 28. It is appreciated that the side walls of the housing may be circular or comprise at least one or more arced wall portions, which result in imparting the fluid ingressing through the inlet port 40 to swirl about the inside surface 46 of the side walls, as mentioned hereinabove.

The construction of the housing and the inlet port can be configured to allow a cyclonic separation or the fuel fluid flow such that the fuel liquid drops are separated from the fuel vapor through vortex separation. The gravity and rotational effects caused by the inlet port extending tangentially to a rounded wall portion facilitate the separation of the fuel droplets and the fuel vapor.

When the fuel flows into the confined space and follows engages the wall portion the fuel droplets in the rotating stream have too much inertia to follow the rounded wall portion, thus striking the inner surface of the wall portion. As a result, and due to the gravity the droplets fall to the bottom of the confined space. The vapor portion if the fuel, however, follows the rounded wall portion due to the relatively low destiny thereof.

It is appreciated that the wall portion 42 in which the inlet port merges need not be the wall portion of the housing, rather can be a wall portion which is inserted inside the confined space for the purpose of allowing the fluid ingressing through the inlet to engage it and to thereby cause a rotational effect thereof, and the cyclone separation of the fuel droplets.

The housing 22 is further configured at the top 30 with a fluid outlet port 60, configured for coupling to a fuel vapor treating device (not shown), such as a canister, an expansion tank, and the like.

The fluid outlet port 60 is in turn is configured with an inlet opening 62 in the form of an annular extension extending downwards from a bottom surface 33 of the top 30 of the housing 22 and extending remote from the side walls 28 (and from the bottom surface 33 of the top 30, owing to said annular extension 62). This arrangement ensures that fluid egressing through the fluid outlet port 60 substantially does not drift along with it liquid droplets.

It is noted that a longitudinal axis X of the fluid outlet port 60 extends substantially parallel to the side walls 28 and normal to the top 30, and further substantially normal to the longitudinal axis T of the substantially tangentially extending fluid inlet port 40.

The housing 28 is configured at the base wall 24 with a liquid drain port 70 for draining any liquids striking the inside surface 46 of the side walls 28, and thereby falling to the bottom of the housing. The liquid drain port is typically configured at a lowermost location of the base wall 24, wherein a longitudinal axis Y of said liquid drain port extends substantially parallel to the longitudinal axis X of the fluid outlet port 60, this however being a particular example only.

Furthermore, the liquid drain port 70 is configured with a valve 74 (only partially seen in FIG. 2A) facilitating fluid flow therethrough only in one direction so as to drain fluid from the confined space 38 and to prevent fluid ingress therethrough. However, it is appreciated that the valve 74 can be of any type, setting as an example only an inverted mushroom-type valve, a spring biased membrane, any type of valve-governed valve, e.g. a rollover valve, etc. also, the valve can be an active valve member, e.g. an active pump valve.

Figure 3A:
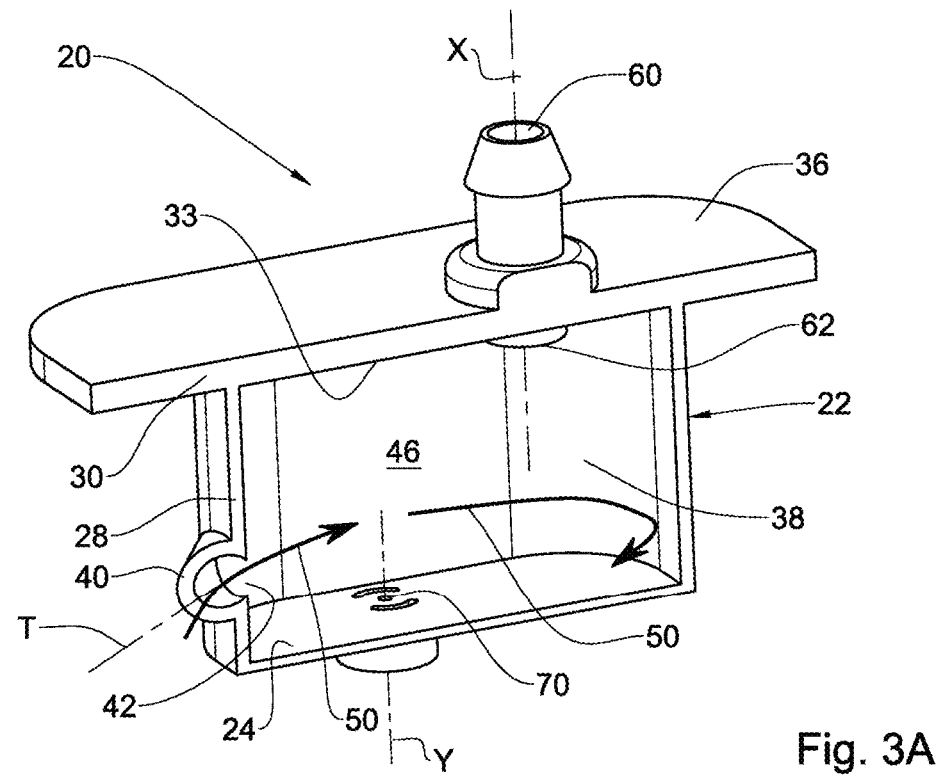
FIG. 3A is section taken along line III-III in FIG. 1.
Figure 3B:
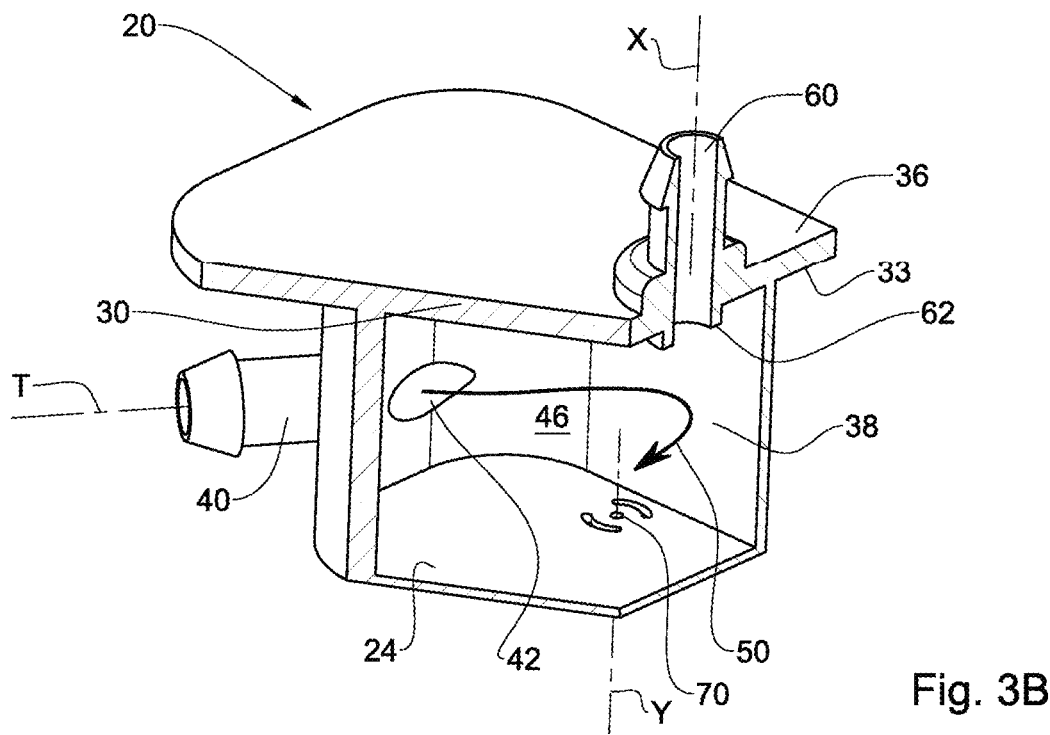
FIG. 3B is section taken along line IV-IV in FIG. 1.

It is further appreciated, from FIGS. 3A and 3B, that the confined space 38 is substantially homogeneous, i.e. devoid of condensation elements such as walls and ribs, whereby condensation takes place substantially over the inside surface 46 of the side walls 28 of the confined space 38.

In operation, fluid vapor flows into the confined space 38 through the inlet port 40, and is imparted a cyclonical flow pattern along the inside surface 46 of the side walls 28, resulting in increasing liquid condensation over the inside surface 46, whereby any fuel liquid droplets drain along the side walls towards the base 24 and then drain out through the liquid drain port 70, and where fuel fluid in gas state is free to egress thorough the fluid outlet port 60, substantially without any liquid droplets.

Further attention is now directed to figured 4A and 4B, illustrating another example of a liquid trap according to the present disclosed subject matter and generally designated 76.

Figure 4A:
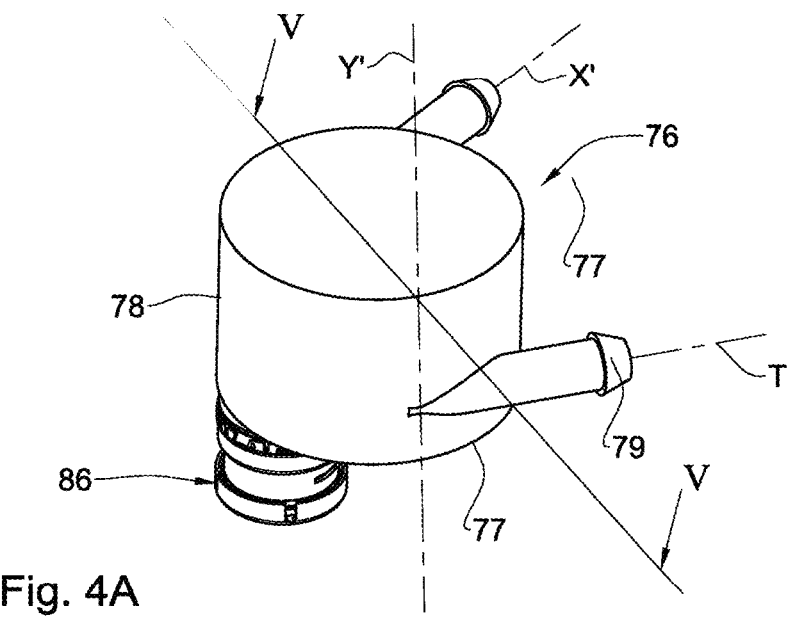
FIG. 4A is a top isometric view of another example of a liquid trap according to the first aspect of the disclosed subject matter.
Figure 4B:
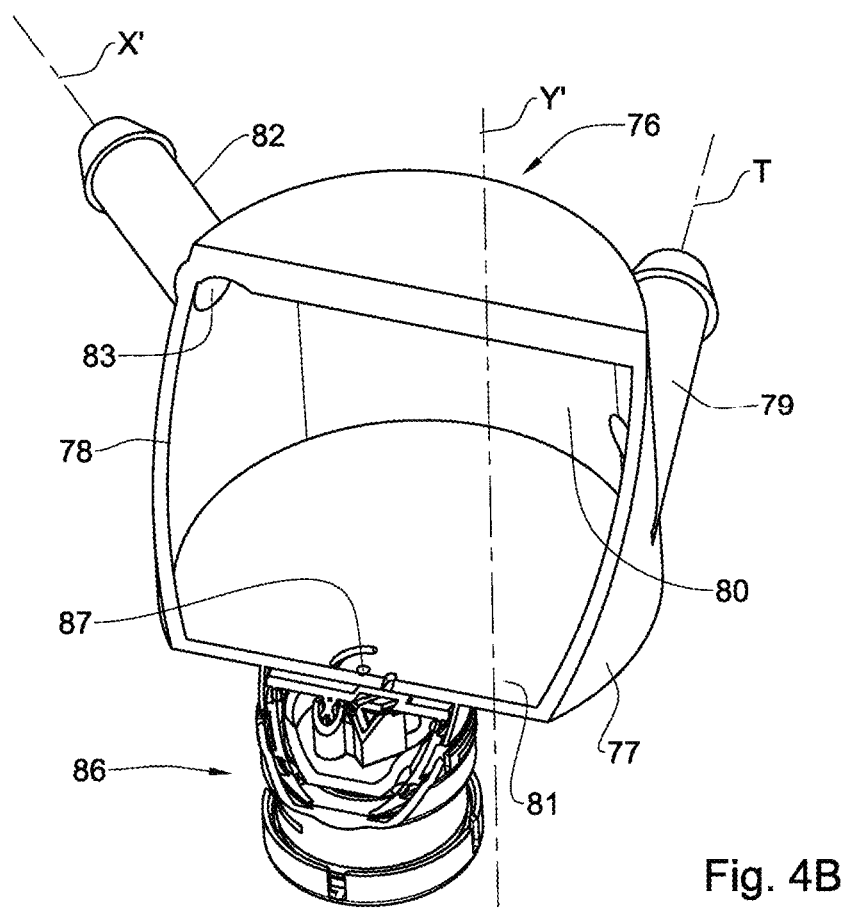
FIG. 4B is a section along plane V in FIG. 4A.
Figure 5:
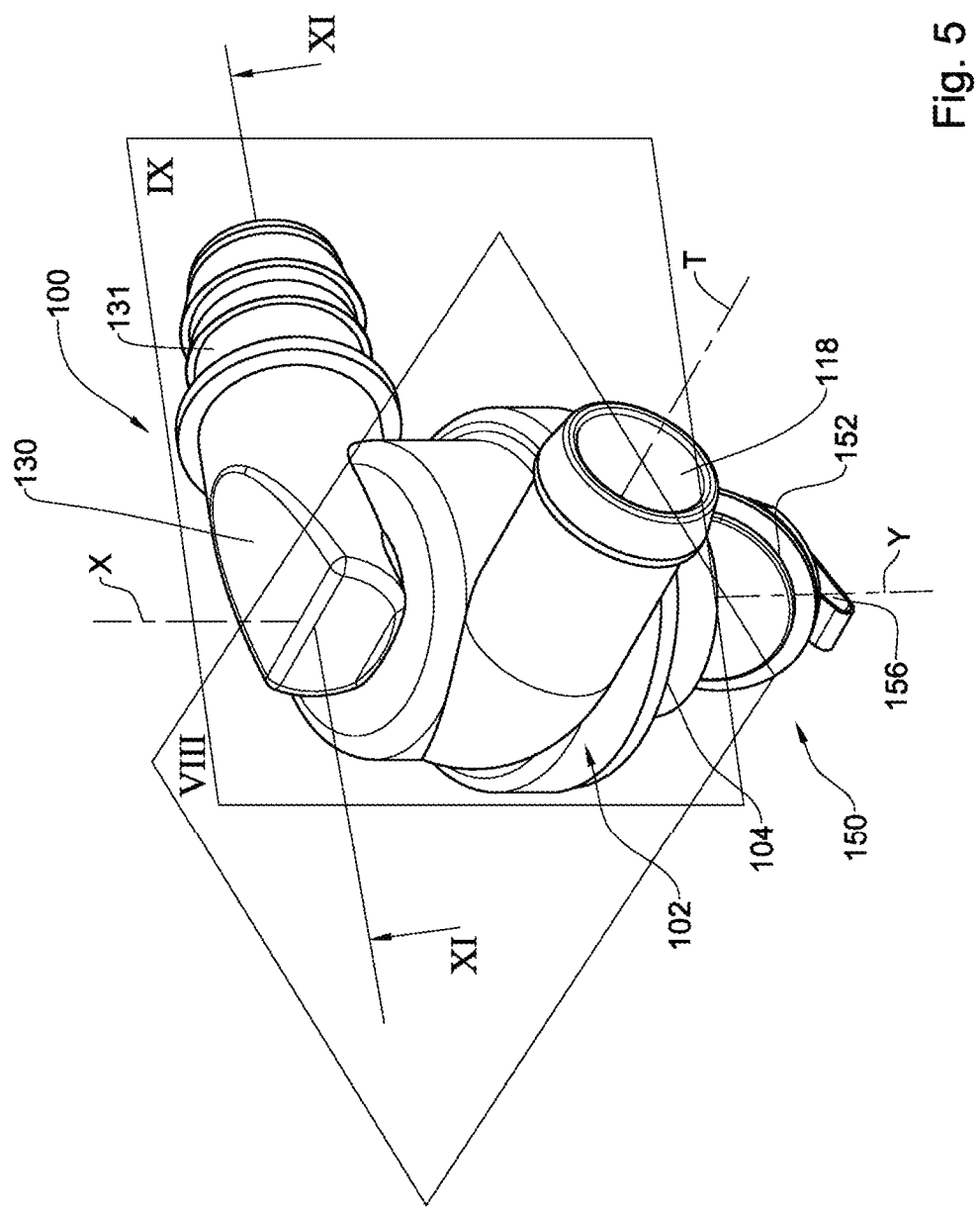
FIG. 5 is a side, top isometric view of a fuel accessory being a liquid vapor separator, according to a second aspect of the disclosed subject matter.
Figure 6:
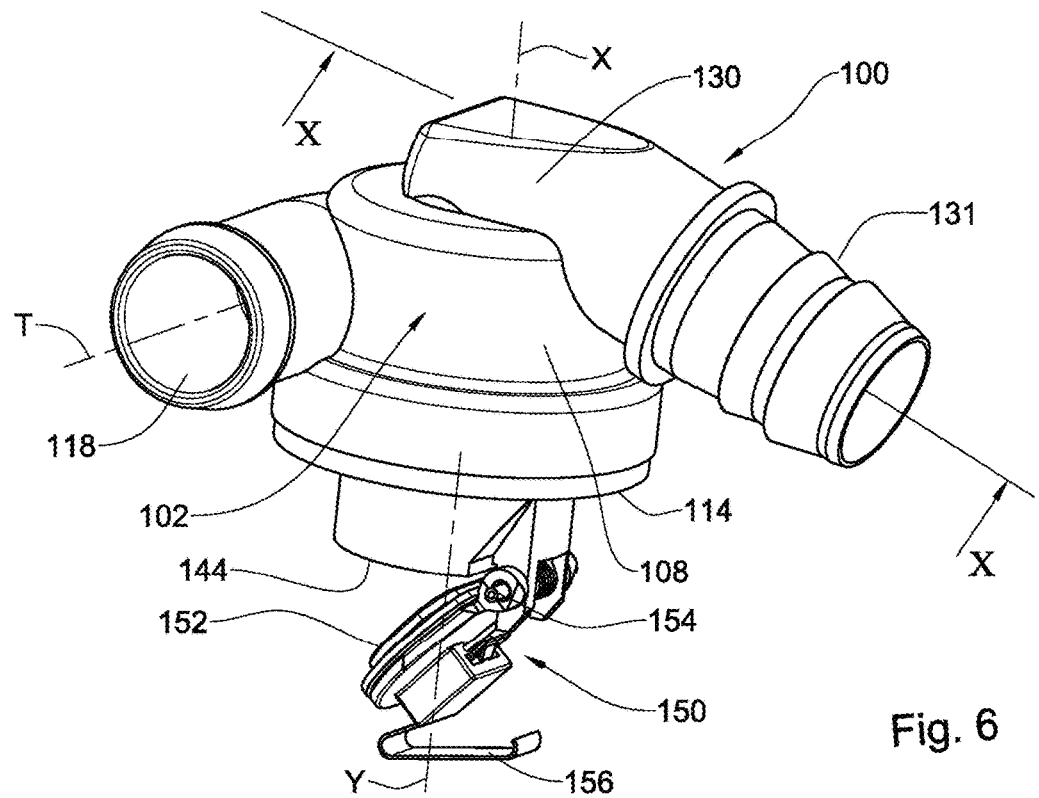
FIG. 6 is a front, top isometric view of the liquid vapor separator of FIG. 5.
Figure 7:
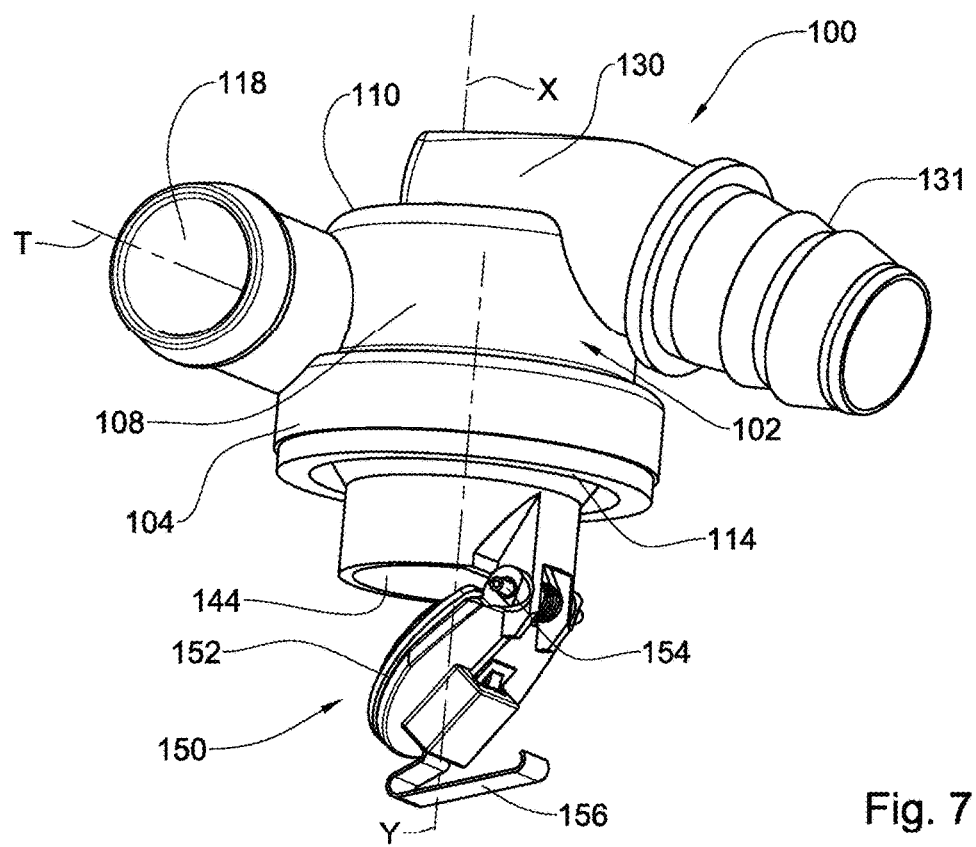
FIG. 7 is a front, bottom isometric view of the liquid vapor separator of FIG. 5
Figure 8:
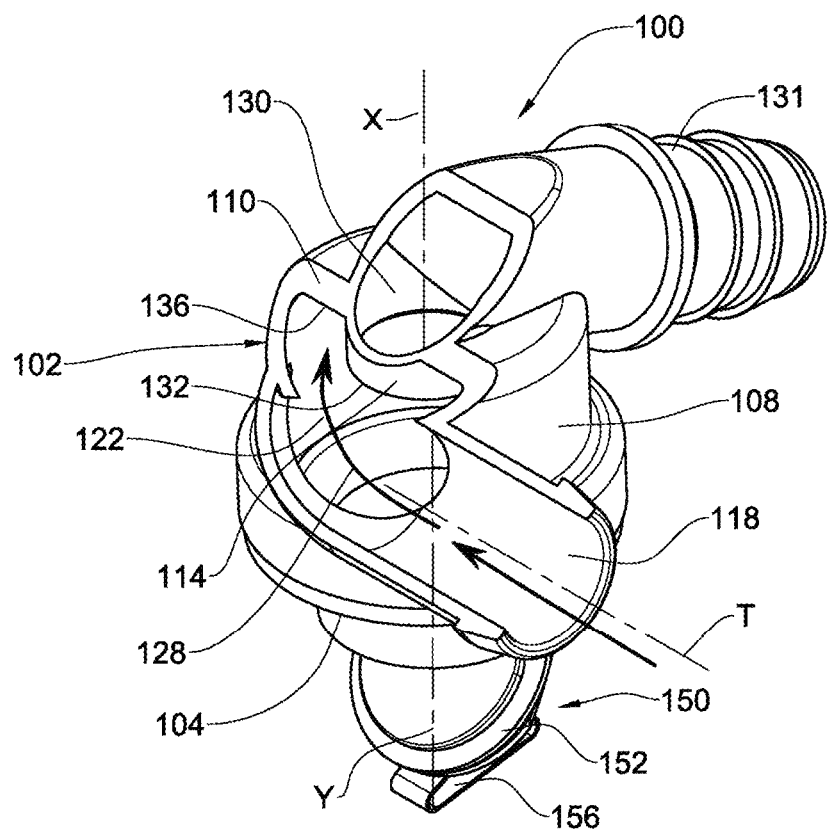
FIG. 8 is partially sectioned view of the liquid vapor separator of FIG. 5, sectioned along plane VIII.
Figure 9:
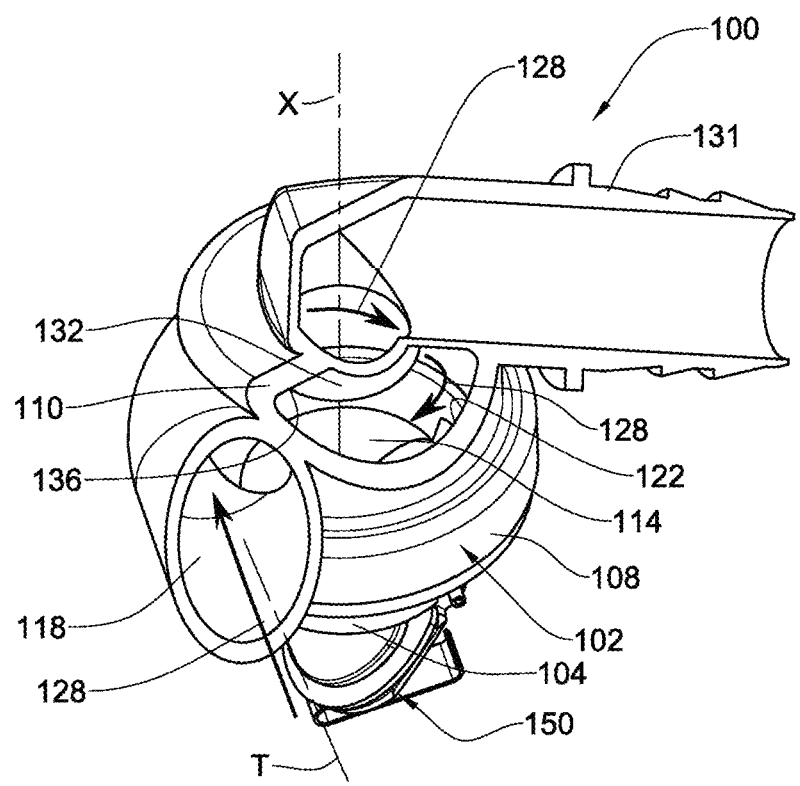
FIG. 9 is another partially sectioned view of the liquid vapor separator of FIG. 5, sectioned along plane IX.

The principle differences between the example illustrated in FIGS. 1 to 3B and those depicted in FIGS. 4A and 4B reside in mainly in three elements. First, it is well noted that the housing 77 has a substantially round (circular) side wall 78. Further noted is the fluid inlet port 79 at a lower portion thereof, i.e. near a bottom wall 81 thereof, and further, a longitudinal axis T of the inlet port 79 extends substantially tangentially into the confined space 80 of the housing 77. Another difference resides in that the outlet port 82 extends from a top portion of the side wall 78, however wherein the inlet opening of the outlet port 82 extends not near the inlet port 79, and such that an axis X' of the outlet port does not coextend with the axis T of the inlet port 79.

In the particular example the inlet port 79 and the outlet port 82 extend substantially normal to a longitudinal axis Y' of the housing 72. Evenmore so, it is noted that the opening of the outlet port 82 is configured with an annular extension 83 extending inwardly from the side wall 78. The above arrangements eliminate or substantially reduce likelihood of fuel droplets escaping through the liquid trap 76 into the outlet port 82.

It is also noted in FIGS. 4A and 4B that the liquid trap 76 is configured at a bottom thereof with a float governed valve 86 (setting as an example only, a rollover valve) being in flow communication with a liquid drain port 87 configured at a lower portion of the housing 77 and being in flow communication with the confined space 80.

Turning now to FIGS. 5 to 11 of the drawings directed to a to a second aspect of the present disclosed subject matter, being a liquid vapor separator (LVS) and generally designated 100.

The liquid vapor separator 100 comprises a housing generally designated 102 with a base portion 104, a tubular (circular) side wall 108 extending therefrom and a top 110, defining together a confined space designated 114.

Figure 10:
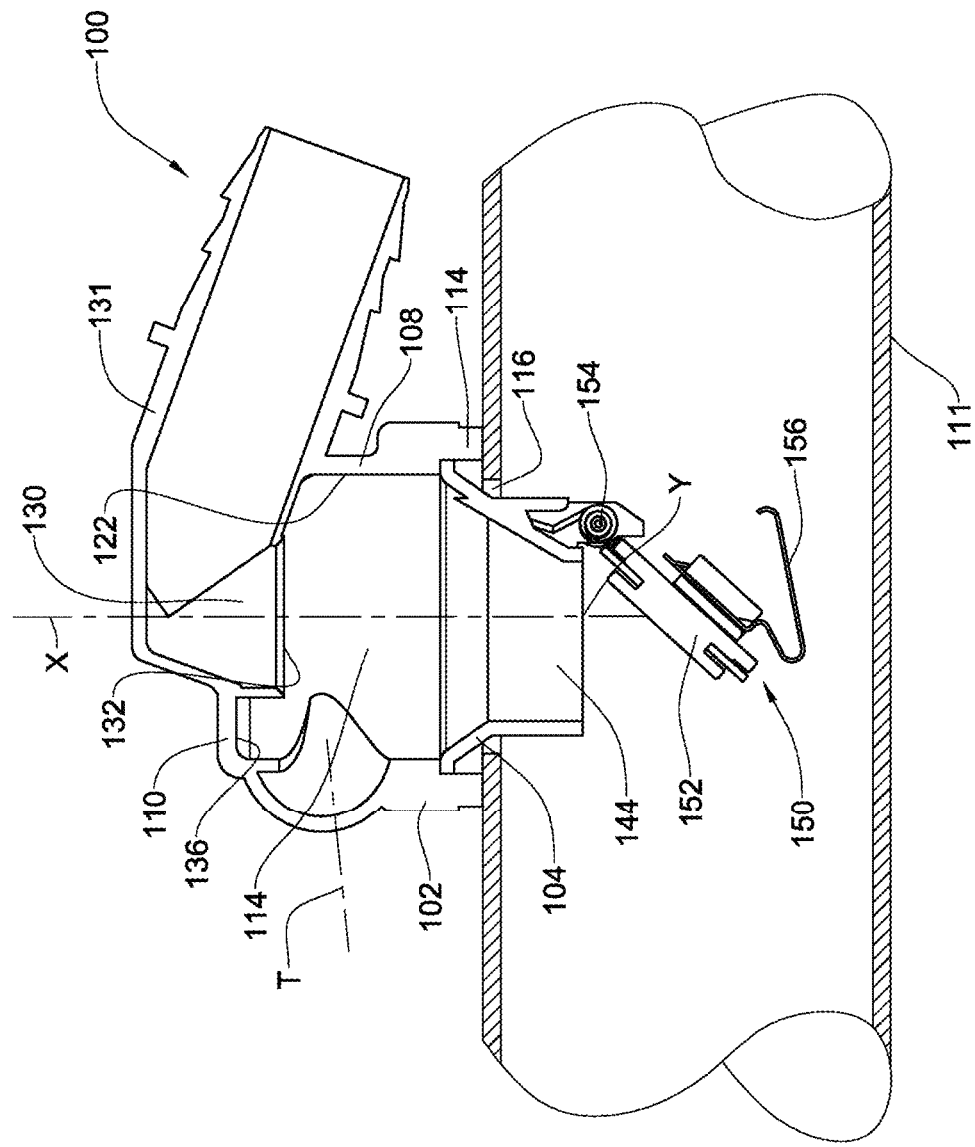
FIG. 10 is a longitudinal view of the liquid vapor separator of FIG. 6, sectioned along line X-X.
Figure 11:
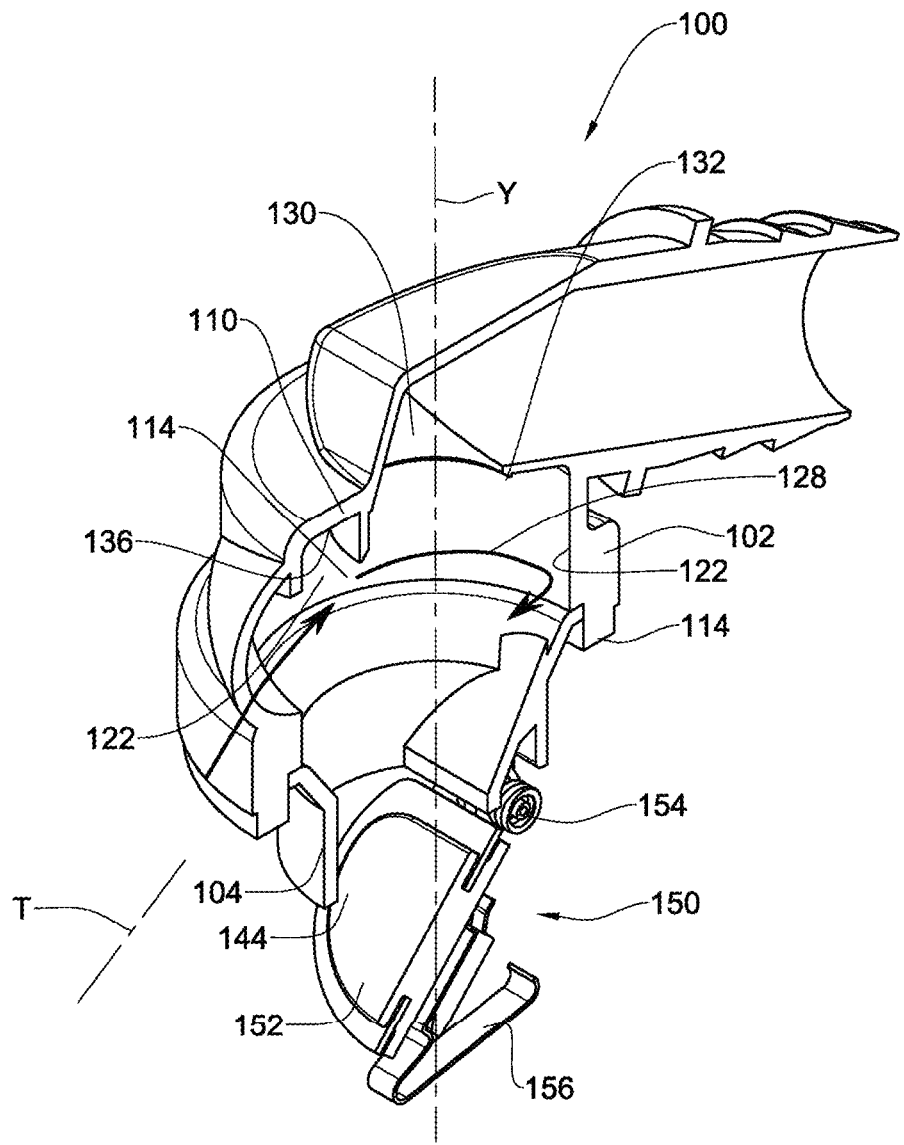
FIG. 11 is a longitudinal view of the liquid vapor separator of FIG. 5, sectioned along line XI-XI.

Noting the fuel accessory is a liquid vapor separator 100, it is thus configured for fitting on a filler neck 111 ('filler pipe'; a schematic portion illustrated for sake of example in FIG. 10), of a vehicle's fuel tank (not shown). The liquid vapor separator 100 is thus configured with a flange 114 extending from the housing 102, for sealingly welding within an opening 116 of the pipe section 111, or otherwise attaching thereto. For example there may be a coupling pipe extending between the housing 102 and the filler neck 111.

The base portion 104, side wall 108 and top 110 define together a fluid-tight confined space 114 (FIGS. 8 to 11) configured with a liquid inlet port 118 extending into the confined space 114 at the tubular side wall 108. The liquid inlet port 118 extends substantially tangent to the side wall 108 and a flow path through the liquid inlet port merges with the side wall portion 108, such that the flow path is minimally interrupted as it enters the confined space 114, and whereby fluid ingressing through the inlet port 118 is caused to swirl about the inside surface 122 of the side wall 108, as represented by arrowed line 128, thus imparting the ingressing fluid a cyclonical flow pattern along the inside surface 122 of the side wall 108.

It is appreciated that the side walls of the housing may be circular or comprise at least one or more arced wall portions, which result in imparting the fluid ingressing through the inlet port 118 to swirl about the inside surface 122 of the side walls 108, as mentioned hereinabove.

The housing 102 is further configured at the top 110 with a fluid outlet port 130, configured for coupling to a fuel vapor treating device (not shown), such as a canister, and the like.

The fluid outlet port 130 is in turn is configured with a coupling pipe extension 131 and an inlet opening 132 in the form of an annular extension extending downwards from a bottom surface 136 of the top 110 of the housing 102 and extending remote from the side walls 108 (and from the bottom surface 136 of the top 110, owing to said annular extension 132). This arrangement ensures that fluid egressing through the fluid outlet port 130 substantially does not drift along with it liquid droplets.

It is noted that a longitudinal axis X of the fluid outlet port 130 extends substantially parallel to the side walls 108 and normal to the top 110, and further substantially normal to the longitudinal axis T of the substantially tangentially extending fluid inlet port 118.

The housing 102 is configured at the base wall 104 with a liquid drain port 144 for draining any liquids engaging the inside surface 122 of the side walls 108, said liquid drain port 144 configured at a lowermost location of the base wall 108, wherein a longitudinal axis Y of said liquid drain port 144 extends substantially coaxial with the longitudinal axis X of the fluid outlet port 130, this however being a particular example only.

Furthermore, the liquid drain port 144 is configured with a normally open shutoff gate assembly generally designated 150, comprising a sealing gate 152 pivotally articulated at 154 to the liquid drain port 144 and fitted with a filler spout engaging lever 156, which is configured for pivotal displacement into a closed position upon introducing a filler spout ('filler gun'; not shown) into the filler pipe 111, to thereby prevent liquid fuel and fuel vapor flow into the liquid vapor separator 100 during a fueling process. However, when the fueling gun is removed from the filler pipe, at the normal course of operation, facilitating fluid flow is facilitated through the liquid drain port 144 in direction so as to drain fluid from the confined space 114.

It is further appreciated that the confined space 114 is substantially homogeneous, i.e. devoid of condensation elements such as walls and ribs, whereby condensation takes place substantially over the inside surface 122 of the side walls 108 of the confined space 114.

In operation, fluid vapor flows into the confined space 114 through the inlet port 118, and is imparted a cyclonical flow pattern along the inside surface 122 of the side walls 108 (illustrated by arrowed flow path 128), resulting in increasing liquid condensation over the inside surface 122, whereby any fuel liquid droplets drain along the side walls towards the base 104 and then drain out through the liquid drain port 144 and into the filler neck 111, and where fuel fluid in gas state is free to egress thorough the fluid outlet port 130 and further through coupling pipe extension 131, substantially without any liquid droplets.

Figure 12A:
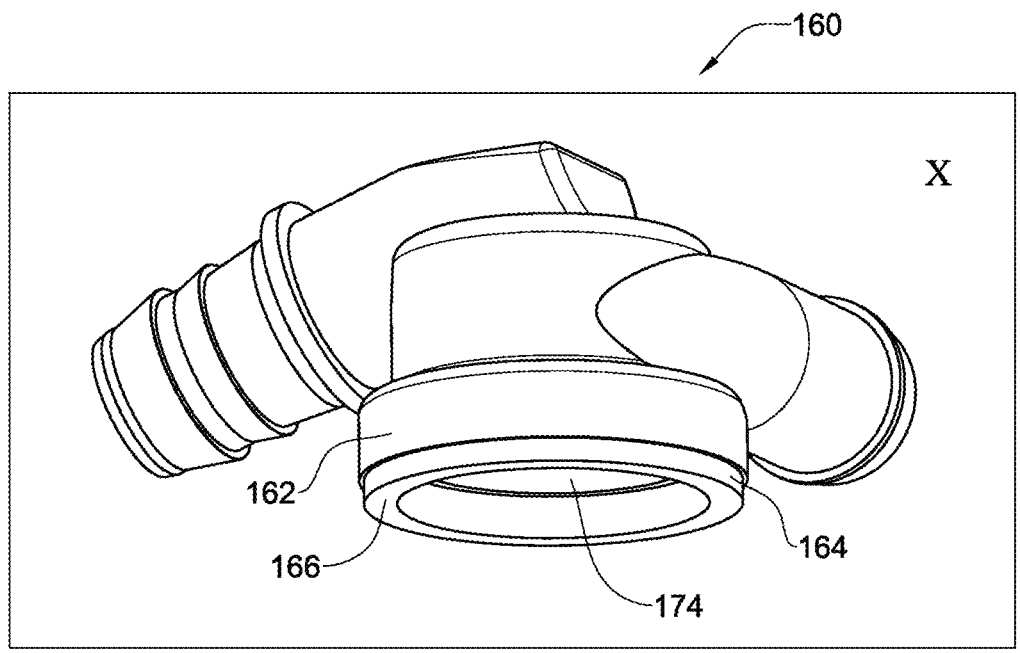
FIG. 12A is a bottom isometric view of another example of a liquid vapor separator according to the second aspect of the disclosed subject matter.
Figure 12B:
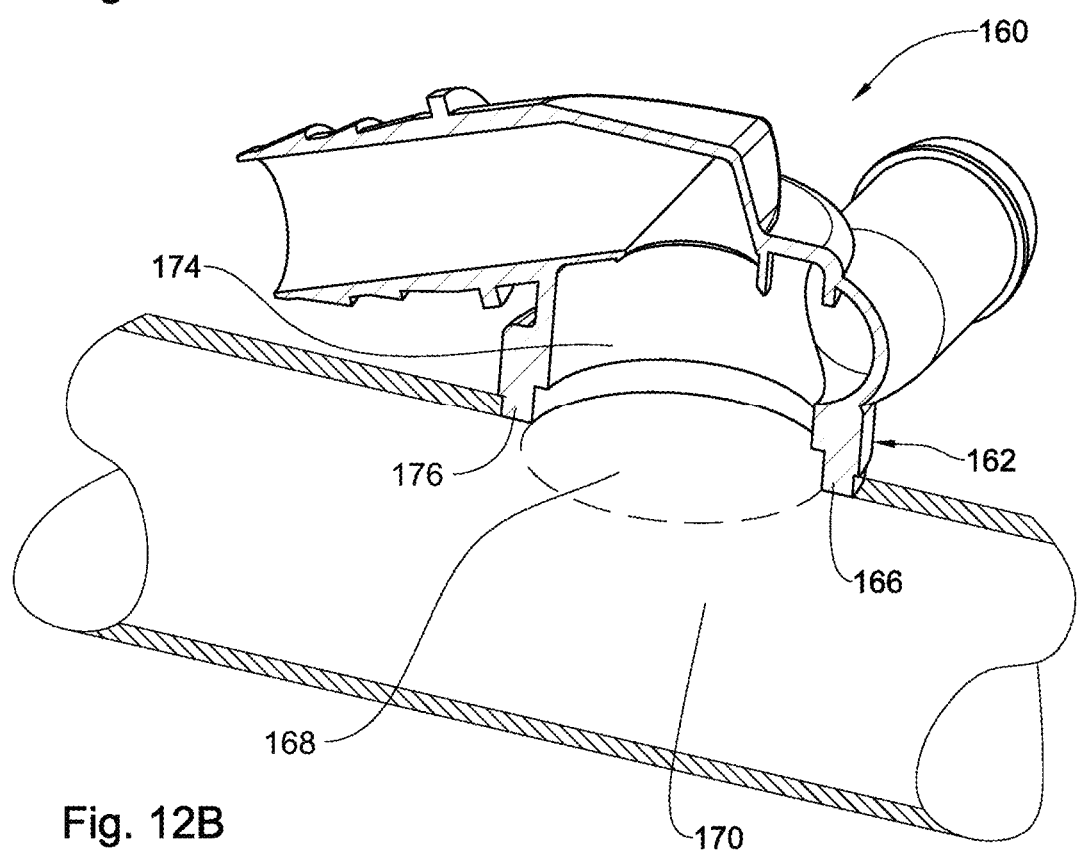
FIG. 12B is a longitudinal section along plane X in FIG. 12A.

Further attention is now directed to the modification of the liquid vapor separator 160 illustrated in FIGS. 12A and 12B. In fact, the basic difference between the liquid vapor separator 100 (as illustrated in FIGS. 5 to 11) and the liquid vapor separator 160 resides in that the housing 162 has a base 164 terminating at an annular seat 166 configured for mounting over a respective opening 168 of a filler pipe 170 of a fuel tank (not shown), devoid of a shutoff gate assembly as presented in the example of FIGS. 5 to 11. Otherwise, structure and operation of the liquid vapor separator 160 is substantially similar to liquid vapor separator 100, whereby fuel droplets generated over the inside surface 174 of the side wall 176 of the housing 162 is free to drip directly into the filler pipe 170 through opening 168.

It is noted that in the case of a fuel trap which is mounted over the filler head, the housing can be formed without a collecting space for collecting the fuel, rather the filler head serves as a collecting space for collecting the fuel. When the pressure in the fuel tank drops below that of the filler head the fuel collected in the filler head is drained into the tank.

The invention claimed is:

1. A fuel accessory for a vehicle's fuel system, the fuel accessory being a liquid separator configured for separating fuel fluid in gas state and fuel liquid in liquid state from fuel vapor, the fuel accessory comprising:
   a housing configured with a confined space;
   at least one fluid inlet port extending into said confined space;
   at least one fluid outlet port extending from said confined space, said at least one fluid outlet port having a corresponding outlet port inlet opening in said confined space; and
   at least one liquid drain port extending from the confined space,
   wherein an inlet flow path defined by said at least one inlet port extends tangentially relative to a wall portion in said confined space,
   wherein said at least one fluid inlet port and said at least one fluid outlet port extend at different axial elevations within the housing,
   wherein said at least one fluid inlet port is axially below the outlet port inlet opening,
   wherein the at least one liquid drain port extends below the at least one fluid outlet port,
   wherein said at least one fluid outlet port is configured for coupling to a fuel vapor treating device,
   wherein said at least one liquid drain port is configured for coupling to a fuel tank, and
   wherein in operation of the liquid separator, fuel fluid vapor flows into the confined space through the inlet port and fuel fluid in gas state is free to egress through the fluid outlet port substantially without any liquid droplets and to the fuel vapor treating device, while allowing fuel liquid droplets to drain out through the liquid drain port to the fuel tank.

2. The fuel accessory according to claim 1, wherein said flow path is configured for generating a centrifugal force inside said confined space whereby fluid ingressing through said at least one inlet port is caused to swirl about an inside surface of side walls of said confined space.

3. The fuel accessory according to claim 1, wherein said inlet port is configured such that an ingressing fuel vapor therethrough is directed and forced to flow about at least a portion of side walls of the confined space, and wherein said wall portion constitutes a portion of said walls.

4. The fuel accessory according to claim 1, wherein side walls of the confined space constitute a portion of said housing, and wherein said confined space is configured such that liquid droplets separate from a ingressing fuel vapor and flow towards the liquid drain port, and fuel vapor flows out through the at least one fluid outlet port.

5. The fuel accessory according to claim 1, wherein said at least one inlet port and said outlet port inlet opening are radially offset.

6. The fuel accessory according to claim 1, wherein a longitudinal axis of said at least one outlet port extends parallel to side walls of the housing and normal to a top of the housing.

7. The fuel accessory according to claim 6, wherein said at least one liquid drain port is configured at a lowermost location of a base wall of said housing, and wherein said longitudinal axis of said at least one outlet port is further parallel to a longitudinal axis of said at least one liquid drain port, and substantially normal to a longitudinal axis of said at least one inlet port.

8. The fuel accessory according to claim 1, wherein said housing is configured as a liquid trap and configured for mounting within a fuel tank.

9. The fuel accessory according to claim 8, wherein a top of the housing is a tank wall portion of the fuel tank.

10. The fuel accessory according to claim 1, wherein said outlet port inlet opening protrudes inwardly from side walls of said confined space.

11. The fuel accessory according to claim 1, wherein said at least one inlet opening is configured as an annular extension extending downwards from a bottom surface of a top of the housing.

12. The fuel accessory according to claim 11, wherein said annular extension extends substantially normal to a bottom surface of said top, or wherein said annular extension extends remote from the side walls of said confined space.

13. The fuel accessory according to claim 1, wherein side walls of said housing are at least partially curved, at least at a location adjacent an inlet opening of said at least one fluid inlet port, such that fluid ingressing therethrough swirls about an inside surface of said side walls of said housing.

14. The fuel accessory according to claim 13, wherein said side wall of said housing is a circular side wall.

15. The fuel accessory according to claim 1, wherein inside side walls of said housing smoothly merge with said at least one fluid inlet port whereby flow pattern of fluid flow entering the housing is substantially uninterrupted.

16. The fuel accessory according to claim 1, wherein the at least one liquid drain port is configured with a control valve facilitating controlled fluid flow therethrough.

17. A fuel tank configured with a fuel accessory in accordance with claim 1.

18. A liquid vapor separator (LVS), configured for separating fuel fluid in gas state and fuel liquid in liquid state from fuel vapor, the LVS comprising:
    a housing configured for mounting within a fuel tank and comprising
        side walls,
        a bottom wall, and
        a top, defining together a confined space;
    at least one fluid inlet port extending into said confined space,
    at least one fluid outlet port extending from said confined space, said at least one fluid outlet port having a corresponding outlet port inlet opening in said confined space; and
    at least one liquid drain port extending from the confined space,
        wherein said at least one inlet port forms a tangential flow path relative to said confined space,
        wherein said at least one fluid inlet port and said at least one fluid outlet port extend at different axial elevations within the housing,
        wherein said at least one fluid inlet port is axially below the outlet port inlet opening,
        wherein the at least one liquid drain port extends below the at least one fluid outlet port,
        wherein said at least one fluid outlet port is configured for coupling to a fuel vapor treating device,
        wherein said at least one liquid drain port is configured for coupling to a fuel tank; and
        wherein in operation of the liquid separator, fuel fluid vapor flows into the confined space through the inlet port and fuel fluid in gas state is free to egress through the fluid outlet port substantially without any liquid droplets and to the fuel vapor treating device, while allowing fuel liquid droplets to drain out through the liquid drain port to the fuel tank.

19. The liquid vapor separator according to claim 18, wherein said housing includes a base terminating at an annular seat configured for mounting over a respective opening of a filler pipe of a fuel tank.

20. A liquid vapor separator (LVS), comprising:
    a housing configured for mounting within a fuel tank and comprising
        side walls,
        a bottom wall, and
        a top, defining together a confined space;
    at least one fluid inlet port extending into said confined space,
    at least one fluid outlet port extending from said confined space, said at least one fluid outlet port having a corresponding outlet port inlet opening in said confined space; and
    at least one liquid drain port extending from the confined space,
    wherein said at least one inlet port forms a tangential flow path relative to said confined space,
    wherein said at least one fluid inlet port and said at least one fluid outlet port extend at different axial elevations within the housing,
    wherein said at least one fluid inlet port is axially below the outlet port inlet opening,
    wherein the at least one liquid drain port extends below the at least one fluid outlet port,
    wherein said at least one fluid outlet port is configured for coupling to a fuel vapor treating device,
    wherein said at least one liquid drain port is configured for coupling to a fuel tank, wherein the at least one liquid drain port is configured for fitting to a filler pipe of a fuel tank, wherein the at least one liquid drain port is associated with a shutoff gate configured for closing by a filling head introduced into said filler pipe, and wherein said shutoff gate comprises a sealing gate pivotally articulated to the liquid drain port and fitted with a filler spout engaging lever configured for pivotal displacement into a closed position upon introduction of said filler head into said filler pipe, to thereby prevent liquid fuel and fuel vapor flow into said confined space during a fueling process.

21. A vehicle having a fuel vapor treating device and having a fuel tank configured with a fuel accessory, the fuel accessory comprising a housing defining with a confined space, at least one fluid inlet port extending into said confined space, at least one fluid outlet port extending from said confined space, said at least one fluid outlet port having a corresponding outlet port inlet opening in said confined space, and at least one liquid drain port extending from the confined space, wherein an inlet flow path defined by said at least one inlet port extends tangentially relative to a wall portion in said confined space, wherein said at least one fluid inlet port and said at least one fluid outlet port extend at different axial elevations within the housing, wherein said at least one fluid inlet port is axially below the outlet port inlet opening, wherein the at least one liquid drain port extends below the at least one fluid outlet port, wherein said at least one fluid outlet port is coupled to said fuel vapor treating device, and wherein said at least one liquid drain port is coupled to said fuel tank.

22. A fuel system for a vehicle having a fuel vapor treating device, comprising a fuel accessory and a fuel tank, the fuel accessory comprising:

a housing configured with a confined space, at least one fluid inlet port extending into said confined space, at least one fluid outlet port extending from said confined space, said at least one fluid outlet port having a corresponding outlet port inlet opening in said confined space, and at least one liquid drain port extending from the confined space, wherein an inlet flow path defined by said inlet port extends tangentially relative to a wall portion in said confined space, wherein the fluid inlet port and the fluid outlet port extend at different axial elevations within the housing, wherein the at least one liquid drain port extends below the at least one fluid outlet port, wherein said at least one fluid inlet port is axially below the outlet port inlet opening, wherein said at least one fluid outlet port is coupled to said fuel vapor treating device, and wherein said at least one liquid drain port is coupled to said fuel tank.

* * * * *